United States Patent
Ohno

(10) Patent No.: US 6,596,366 B2
(45) Date of Patent: Jul. 22, 2003

(54) OPTICAL RECORDING MEDIUM AND PROCESS FOR PRODUCING AN OPTICAL RECORDING MEDIUM

(75) Inventor: Takashi Ohno, Yokohama (JP)

(73) Assignee: Mitsubishi Chemical Corporation, Tokyo (JP)

( * ) Notice: Subject to any disclaimer, the term of this patent is extended or adjusted under 35 U.S.C. 154(b) by 0 days.

(21) Appl. No.: 09/918,487

(22) Filed: Aug. 1, 2001

(65) Prior Publication Data

US 2002/0025443 A1 Feb. 28, 2002

(30) Foreign Application Priority Data

Aug. 2, 2000 (JP) ......................................... 2000-234296

(51) Int. Cl.⁷ ................................................. B32B 3/02
(52) U.S. Cl. .................... 428/64.1; 428/64.5; 428/64.6; 430/270.13
(58) Field of Search ............................... 428/64.1, 64.4, 428/64.5, 64.6, 913; 430/270.13, 495.1, 945; 369/283

(56) References Cited

U.S. PATENT DOCUMENTS

| | | | |
|---|---|---|---|
| 5,604,003 A | * 2/1997 | Coombs | 428/64.1 |
| 5,848,043 A | 12/1998 | Takada et al. | |
| 5,862,123 A | 1/1999 | Horie et al. | |
| 6,004,646 A | 12/1999 | Ohno et al. | |
| 6,108,295 A | 8/2000 | Ohno et al. | |
| 6,115,352 A | 9/2000 | Ohno et al. | |
| 6,115,353 A | 9/2000 | Horie et al. | |
| 6,128,273 A | 10/2000 | Ohno et al. | |
| 6,143,468 A | 11/2000 | Ohno et al. | |
| 6,177,166 B1 | 1/2001 | Ohno et al. | |
| 6,294,310 B1 | 9/2001 | Ohno et al. | |

2002/0160307 A1 * 10/2002 Jeong .................... 430/270.13

FOREIGN PATENT DOCUMENTS

| | | |
|---|---|---|
| JP | 4-360039 | 12/1992 |
| JP | 2000-21020 | 1/2000 |
| JP | 2000-228033 | 8/2000 |

OTHER PUBLICATIONS

U.S. patent application Ser. No. 09/730,514, Pending, filed Dec. 5, 2000.
U.S. patent application Ser. No. 10/077,297, Pending, filed Feb. 19, 2002.
U.S. patent application Ser. No. 09/919,846, Pending, filed Aug. 2, 2001.
U.S. patent application Ser. No. 09/918,487, Pending, filed Aug. 1, 2001.

* cited by examiner

Primary Examiner—Elizabeth Mulvaney
(74) Attorney, Agent, or Firm—Oblon, Spivak, McClelland, Maier & Neustadt, P.C.

(57) ABSTRACT

An optical disc having excellent recording/retrieving characteristics and capable of improving the surface properties of the reflective layer without reducing the thermal conductivity, the reflectivity and producibility.

An optical recording medium for recording and/or retrieving information by irradiation of light, which comprises a substrate, and an interlayer, a reflective layer containing a metal as the main component and a recording layer, formed in this order on the substrate directly or via another layer made of a resin or a dielectric material, wherein as observed from a light-incoming direction, the reflective layer is located in front of the interlayer, the interlayer contains the same metal as the metal constituting the main component of the reflective layer and also contains oxygen and/or nitrogen, and the interlayer has a content of the metal smaller than the reflective layer.

20 Claims, 9 Drawing Sheets

OPTICAL RECORDING MEDIUM AND PROCESS FOR PRODUCING AN OPTICAL RECORDING MEDIUM

The present invention relates to an optical recording medium of high density represented by an optical disc. In particular, the present invention relates to an optical recording medium having a surface in which the number of recesses and projections is small, and having a reflective layer excellent in characteristics. Further, the present invention relates to an optical recording medium capable of improving the surface properties of the reflective layer without damaging properties such as high thermal conductivity, high reflectivity, excellent productivity and so on, and providing excellent recording/retrieving characteristics.

In many optical discs, a reflective layer containing a metal as the main component is used. In an optical disc such as an optical disc exclusively used for retrieving, CD-R or the like, the reflective layer functions to increase the quantity of returning light by reflecting light. Although the reflectivity of the medium such as a magneto-optical recording medium, a phase-change recording medium or the like, is not so high, light reflected at the reflective layer is utilized to increase the intensity of signals. Further, the reflective layer having a high thermal conductivity is utilized for solving a problem of heat. Namely, it is preferable that the reflective layer has sufficient reflectivity and thermal conductivity. In particular, the high thermal conductivity is important for a rewritable phase-change optical disc wherein the cooling speed after the temperature rise by irradiation of light to the medium influences largely the formation of recording marks.

In recent years, there has been proposed a system to obtain a further high density wherein the numerical aperture (NA) of an objective lens in an optical system used for recording or retrieving is made large, and the lens is brought closer to the medium. In this case, in order to bring the objective lens close to the recording layer as possible, it is preferable to conduct recording or retrieving from a layer surface side (the surface side of the recording layer on the side opposite to the substrate) without passing light through the substrate having a larger thickness. There is another problem that since an objective lens having a high NA has a larger thickness, it is difficult to bring the lens close to the medium. Further, there has been made an attempt to introduce light from the layer surface side but not from the substrate side by the reasons of reducing the deterioration of the characteristics due to an inclination of the substrate, to reduce the birefringence of the substrate and so on.

When a metallic layer having sufficiently high reflectivity and thermal conductivity is formed by sputtering or the like, the surface roughness of the layer tends to increase as the layer thickness becomes thick. Accordingly, the surface roughness of the metallic layer (the surface of the metallic layer on the side opposite to the substrate) becomes inevitably large, whereby the surface roughness of the reflective layer is generally large.

FIG. 3 is an example of the layer structure of a substrate side incident type optical disc. A protective layer 2, a recording layer 3, a protective layer 4 and a reflective layer 5 are laminated on the substrate 1 wherein the reflective layer 5 has a large surface roughness. However, the reflective layer is generally formed to have a certain thicker dimension so that the light transmittance of light for recording or retrieving becomes small. Accordingly, when light 10 is introduced from a substrate side, the almost amount of light is reflected at a rear surface of the reflective layer, and accordingly, the surface roughness of the reflective layer does not substantially influence the recording or retrieving.

On the other hand, circumstances differ in a case of introducing light from a layer surface side. FIG. 2 is an example of the layer structure of a layer surface side incident type optical disc. A reflective layer 5, a protective layer 4, a recording layer 3 and a protective layer 2 are laminated on the substrate 1. Light 10 introduced from a layer surface side is reflected at a front surface of the reflective layer having a large surface roughness as shown in FIG. 2. Accordingly, there is a problem that the surface roughness of the reflective layer influences largely the recording/retrieving characteristics. Specifically, there is a problem that noises in recording or retrieving become large.

Further, there is considered the same problem in a case of forming the recording layer after a thin translucent metallic layer has been formed (in a case of forming a translucent metallic layer between the substrate 1 and the recording layer 3 in FIG. 3) even when light is introduced from a substrate side.

These problems become remarkable as the size of laser beams is smaller. Therefore, when the laser wavelength is made short or the numerical aperture NA of the objective lens is made large in order to perform high density recording, a large problem will arise.

The phenomenon that a metallic layer having high reflectivity and thermal conductivity has a large surface roughness is related largely to crystal grains. For example, a low growing speed of crystallization at the grain boundary of crystal grains is one of the factors.

In view of the above, there have been proposed techniques to improve the surface properties of the layer: e.g., a method for making the crystal grain size fine and uniform by mixing impurities in the reflective layer, a method for conducting reverse sputtering after the formation of the reflective layer (JP-A-2000-228033), a method for making the crystal grains in the reflective layer fine and uniform by using particle of Cr or the like as crystal nuclei of the material for the reflective layer, and so on.

However, any of the above-mentioned methods has a drawbacks. Namely, the method for mixing impurities in the material of the reflective layer of metal reduces its thermal conductivity or reflectivity by mixing impurities. The method for conducting reverse sputtering after the formation of the reflective layer is not suitable for mass production because a layer forming process is complicated and takes much time. Further, the method for using particles of Cr or the like as crystal nuclei has difficulty in controlling the particles of Cr or the like to have a size suitable for the crystal nuclei for the reflective layer and is not suitable for productivity. In short, these methods could not provide the reflective layer excellent for all requirements such as thermal conductivity, reflectivity, surface properties, good productivity and so on.

It is an object of the present invention to eliminate the above-mentioned problems and to provide an optical recording medium capable of improving the surface properties of the reflective layer without damaging the properties such as thermal conductivity, reflectivity, good productivity and having excellent recording/retrieving characteristics.

The inventor of this application has achieved the present invention by finding that the crystal grain size can be made fine and uniform, without a special contrivance to the reflective layer itself, by forming a specified layer containing the same metallic element as the metal constituting the main component of the reflective layer on the surface of the reflective layer facing the substrate, whereby the reduction of noises in retrieving can be achieved.

In accordance with a first aspect of the present invention, there is provided an optical recording medium for recording and/or retrieving information by irradiation of light, which comprises a substrate, and an interlayer, a reflective layer containing a metal as the main component and a recording layer, formed in this order on the substrate directly or via another layer made of a resin or a dielectric material, wherein as observed from a light-incoming direction, the reflective layer is located in front of the interlayer, the interlayer contains the same metal as the metal constituting the main component of the reflective layer and also contains oxygen and/or nitrogen, and the interlayer has a content of the metal smaller than the reflective layer. The main component means 50 atomic % or more.

In accordance with a second aspect of the present invention, there is provided an optical recording medium for recording and/or retrieving information by irradiation of light, which comprises a substrate, and a crystal grain size-controlling layer, a reflective layer containing a metal as the main component and a recording layer, formed in this order on the substrate directly or via another layer made of a resin or a dielectric material, wherein as observed from a light-incoming direction, the reflective layer is located in front of the interlayer, and the crystal grain size-controlling layer has a function to make the crystal grain size of the metal forming the reflective layer fine and uniform.

In accordance with a third aspect of the present invention, there is provided a process for producing an optical recording medium for recording and/or retrieving information by irradiation of light, which comprises a substrate, and an interlayer, a reflective layer containing a metal as the main component and a recording layer, formed in this order on the substrate directly or via another layer made of a resin or a dielectric material, wherein as observed from a light-incoming direction, the reflective layer is located in front of the interlayer, and the interlayer contains the same metal as the metal constituting the main component of the reflective layer and also contains oxygen and/or nitrogen, said process comprising sputtering the metal onto the surface of said substrate or said another layer while introducing oxygen and/or nitrogen into the atmosphere, to form said interlayer, and then, sputtering the metal without introducing oxygen and/or nitrogen, to form said reflective layer.

As one of the features of the present invention, the crystal grain size-controlling layer having a function to make the crystal grain size of the metal forming the reflective layer thin and uniform, is formed previously under the reflective layer of metal. The inventors of this application have found that with such structure, the surface properties of the reflective layer can be improved, and noises from the optical recording medium can be reduced. Further, there is no possibility of damaging the thermal conductivity and the reflectivity of the reflective layer. Further, since the crystal grain size-controlling layer can be formed easily, excellent productivity is obtainable.

Further, the inventors have found that the interlayer having a specified composition is excellent as the crystal grain size-controlling layer for the reflective layer of metal. In addition, they have found the process for producing the optical recording medium with good productivity.

In drawings:

FIG. 4($b$) is a differential picture image thereof;

FIG. 5($b$) is a differential picture image thereof;

FIG. 6($b$) is a differential picture image thereof;

FIG. 7($b$) is a differential picture image thereof.

In the following, the present invention will be described in detail.

As one of the features of the optical recording medium according to the present invention, a crystal grain size-controlling layer, a reflective layer containing a metal as the main component and a recording layer are formed in this order on a substrate directly or via another layer made of a resin or a dielectric material; the reflective layer is located in front of the interlayer as observed from a light-incoming direction, and the crystal grain size-controlling layer has a function to make the crystal grain size of the metal forming the reflective layer fine and uniform.

Although the mechanism of such function in this structure is not always clear, it can be considered as follows. The clarification of the mechanism of the function is based on recognition by the inventors at the time of filing this application, and it should be understood that there is no influence to the effectiveness of this invention as far as the effect of the present invention can be achieved with the construction according to this invention even if there arises contradiction or error in this clarification in feature.

Figure 1:
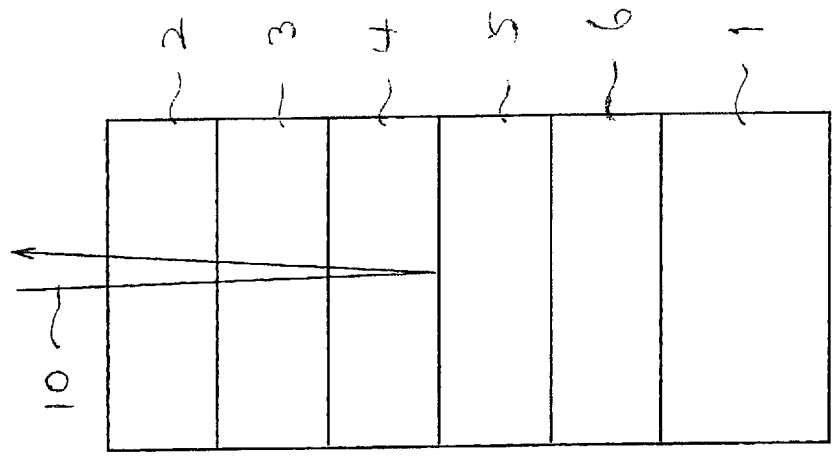
FIG. 1 is an example of the layer structure of the optical recording medium according to the present invention
Figure 2:
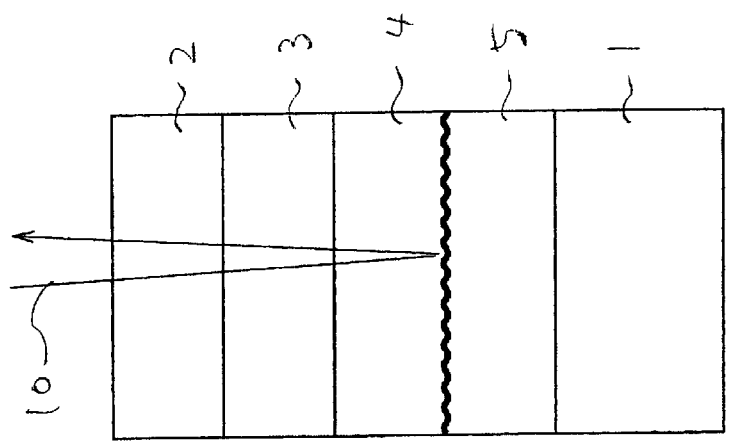
FIG. 2 is an example of the layer structure of a conventional optical recording medium.
Figure 3:
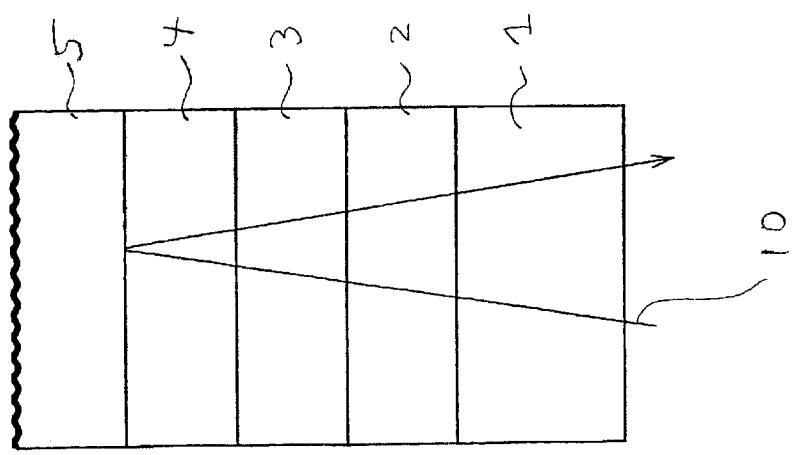
FIG. 3 is another example of the layer structure of the conventional optical recording medium.

FIG. 1 is an example of the layer structure of the optical recording medium of the present invention wherein a crystal grain size-controlling layer 6, a reflective layer 5, a protective layer 4, a recording layer 3 and a protective layer 2 are laminated on a substrate 1. Light 10 for recording or retrieving comes from the layer surface side and is reflected at a top surface of the reflective layer. In this case, when the crystal grain size of the metal forming the reflective layer is fine and uniform and the surface roughness of the reflective layer is small, there is no problem that noises become large at the time of recording or retrieving.

In the circumstances that the layer surface is likely to affect optically, as assumed in the present invention, it is considered that the size of recesses and projections in the layer surface is important. If the size of the recesses and projections in the surface of an optical disc is sufficiently smaller than the spot size of laser light used, there will cause no problem at the time of retrieving. Since the size of the recesses and projections is largely related to the crystal grain size, the reduction of the crystal grain size is useful for improving the characteristics of the optical disc.

As one of the reasons that the crystal grain size of the reflective layer is large, it is considered that since nucleation is prevented in a material for the reflective layer on the substrate (typically made of a resin) or an underlayer such as a protective layer of dielectric material, the growth of a crystal grain is accelerated three-dimensionally in an initial stage of the layer formation. Accordingly, the height of the projections or the depth of recesses is large already in the initial stage of the layer formation. If an underlayer has a structure similar to the reflective layer, it must have nuclei everywhere, whereby there is no possibility that a crystal grain grows locally in an initial stage of the layer formation. Namely, the same effect as forming a number of crystal nuclei is obtainable, and the formation of a fine crystal grain size can be expected.

In connection with this, however, the front surface of the underlayer should be smooth. In general, when a layer is not crystalline but amorphous, the problem of crystal nuclei would not be created, and the layer having a smooth front surface would be obtainable. When a material for the reflective layer contains a sufficient amount of impurity such as oxygen, it has a structure similar to an amorphous structure. In consideration of these, the growth of coarse crystalline grains caused by the fact that there is difficulty in forming said crystal nuclei, could be suppressed by forming a layer having a structure similar to an amorphous structure, which is obtained by mixing a sufficient amount of oxygen and so on in a material for the reflective layer before the formation of it, or depending on circumstances, by reducing gradually a supply of oxygen to have a gradient in the amount of oxygen.

In the mechanism of such function, the crystal grain size of a metal forming the reflective layer can be made fine and uniform by forming the crystal grain size-controlling layer, and the surface properties of the reflective layer of metal can be improved without damaging the thermal conductivity, the reflectivity and productivity. Accordingly, the optical recording medium having excellent characteristics of disc signal can be obtained.

The present invention provides a remarkable effect when the spot size of laser beams is reduced by shortening the wavelength of laser or increasing the numerical aperture NA of an objective lens. Specifically, when the wavelength of laser is from about 350 nm to about 650 nm, and NA is from about 0.60 to 0.90 for example, a remarkable effect is obtainable.

Next, the composition of the crystal grain size-controlling layer will be described.

The interlayer which contains the same metal as the metal constituting the main component of the reflective layer and also contains oxygen and/or nitrogen, wherein the content of the metal is smaller than the reflective layer is supposed to have the above-mentioned crystal grain size-controlling function, and the function is proved in examples described hereinafter.

Namely, it is preferable to mix a specified impurity in the metal constituting the main component of the reflective layer. Depending on circumstances, instead of the crystal grain size-controlling layer of single layer made of a uniform composition, the amount of the impurity may be decreased gradually from the substrate toward the reflective layer. When the impurity is oxygen and/or nitrogen, the introduction rate of oxygen and/or nitrogen may be changed in the formation of the layer in, for instance, sputtering, whereby a gradient in the content of oxygen or the content of nitrogen can easily be formed. Ideally, it would be preferable to reduce gradually the content of the mixture as described above. However, when the crystal grain size-controlling layer which satisfies both advantages that the surface is smooth and the formation of crystal nuclei in a material for the reflective layer is easy, is used, the content of the mixture may be uniform.

Further, the crystal grain size-controlling layer is not always necessary to have a complete amorphous structure on the substrate side, but it may have a crystal structure as far as it can keep smoothness. However, in order to obtain a sufficient smoothness, it is preferred to increase the content of a mixed component other than the metal for the reflective layer until an amorphous structure or a crystal structure different from the crystal structure of the metal for the reflective layer is obtained. However, a certain effect can often be found before reaching an amorphous structure or a crystalline state of a compound different from the metal for the reflective layer. The crystal structure can be confirmed with use of X-ray diffraction, electron beam diffraction or the like.

As an element in the crystal grain size-controlling layer, mixed to the metal for the reflective layer, it preferably has a nature of making the crystal grain size fine by being mixed with the reflective layer, and specifically, a non-metallic element is used. Use of a non-metallic element forms easily a compound with the metal for the reflective layer, and accordingly, there is a high possibility of forming an amorphous structure, whereby the front surface of layer would be made smooth. As the non-metallic element, oxygen, nitrogen or the like are mentioned as typical examples. However, it is preferred that the component to be mixed does not diffuse in the reflective layer. Further, it is preferable that the layer formed is stable. In addition, oxygen or nitrogen can easily be taken into the layer by introducing an oxygen gas or a nitrogen gas into a sputtering atmosphere in forming the layer. In particular, an element having a high reactivity with the metal for the reflective layer is preferable, and oxygen is most preferable.

Further, it is desirable that an impurity element and the metal for the reflective layer form a compound because the compound is apt to be amorphous in general, hence, the front surface of layer is made smooth. For example, Ag and oxygen can form a compound such as AgO, $Ag_2O$ or the like.

The content of a metallic element in the crystal grain size-controlling layer, which is the same as the metal constituting the main component of the reflective layer should be smaller than that in the reflective layer from the viewpoint of making the surface of the layer smooth. The content of the metallic element in the crystal grain size-controlling layer on the substrate side is usually at most 95 atomic %, preferably, at most 90 atomic %. For instance, in a case that the reflective layer is made of Ag and the crystal grain size-controlling layer is of Ag—O, the crystal grain size-controlling layer should have a structure closer to an amorphous structure on the substrate side in consideration of smoothness, and accordingly, the structure of a composition close to AgO or $Ag_2O$ should be formed on the substrate side. Similarly, in a case that the reflective layer is made of Al and the crystal grain size-controlling layer is of Al—O, a composition close to $Al_2O_3$ or the like may be provided on the substrate side. The amount of oxygen can be measured by an analysis method such as XPS method.

However, if the content of the metallic element constituting the many component is too small, the layer structure may be fragile. Accordingly, the content is usually at least 30 atomic %, preferably, at least 40 atomic %. Further, in order to facilitate the formation of crystal nuclei in the material for the reflective layer, it is preferable that the metal for the reflective layer constitutes the main component even in the crystal grain size-controlling layer. The main component means at least 50 atomic %.

The thickness of the crystal grain size-controlling layer is generally selected from a range of from about 1 nm to 100 nm. When the reflective layer has a sufficient thickness and light comes from the layer surface side, there is no influence optically, and accordingly, there is no limitation to an optical layer thickness. However, the layer thickness is needed to have a certain extent in order to obtain an effect of controlling the crystal grain size. The layer thickness is preferably 5 nm or more. It is preferable that the thickness is not too large from the viewpoint of causing a stress in the layer, a time of forming the layer and cost. Preferably, the thickness is 50 nm or less.

When the reflective layer of metal is a translucent, it is necessary to be thin in general because the crystal grain size-controlling layer is affected optically. Therefore, layer thickness is preferably 10 nm or less.

When the crystal grain size-controlling layer has a gradient in composition (the composition varies in a direction of the thickness), there may be difficulty in finding the boundary to the reflective layer. In such case, if the crystal grain size-controlling layer contains a specified impurity element, a portion where such element does not substantially exist can be considered as the interface. In the case of the combination of the above-mentioned crystal grain size-controlling layer of Ag—O and the reflective layer of Ag, a portion where an oxygen component is substantially 0 is determined to be the interface of them.

The average rough grain size of the front surface of the crystal-grain size-controlling layer would be influenced largely by the average rough grain size of the front surface of the reflective layer. The average rough grain size of the crystal grain size-controlling layer is preferably at most 6,000 nm$^2$ in the disc surface, more preferably, at most 500 nm$^2$, and most preferably, at most 2,500 nm$^2$. The average rough grain size of the front surface has a value obtained by dividing a measured area by the number of projections in fine recesses and projections in that area. The average rough grain size is better as smaller. Although there is in particular no lower limit, the size is actually 500 nm$^2$ or more.

The surface roughness of the crystal grain size-controlling layer preferably has an average rough grain size Ra of at most 2 nm, more preferably, at most 1 nm.

A material for constituting the reflective layer is preferably such one, as described above, having a large reflectivity and a large thermal conductivity. As the material having large reflectivity and thermal conductivity, a metal containing Ag, Au, Al, Cu or the like as the main component may be mentioned. Among these, Ag has the highest reflectivity and thermal conductivity. Since Au, Al or Cu is apt to absorb light in comparison with Ag in a shorter wavelength, it is in particular preferable to use Ag when laser having a short wavelength of 650 nm or less is used. Further, Ag is preferable because the price as a target for sputtering is relatively low, a stable electric discharge is obtainable and the layer forming speed is high, and it is stable in air.

Ag, Au, Al and Cu are disadvantageous because when an impurity is mixed with, the thermal conductivity and the reflectivity decrease. Accordingly, a highly purified product of such metal is generally used. However, for the purpose of improving the stability and the smoothes of the layer surface, an impurity element such as Cr, Mo, Mg, Zr, V, Ag, In, Ga, Zn, Sn, Si, Cu, Au, Al, Pd, Pt, Pb, Ta, Ni, Co, Se, Nb, Ti or the like may be contained in an amount of about 5 atomic % or less.

The layer thickness of the reflective layer is generally 50 nm or more. In order to obtain sufficient reflectivity and heat radiation effect, a layer thickness to a certain extent is required. However, it is preferable to form it thin from the viewpoint of a stress in the layer, a time of forming the layer and cost. The layer thickness is generally 200 nm or less. When the reflective layer is used as a translucent layer by reducing the layer thickness, 5–50 nm is preferable.

The average rough grain size of the front surface of the reflective layer can be reduced by forming the crystal grain size-controlling layer. It is preferable that the average rough grain size of the front surface of the reflective layer is at most 6,000 nm$^2$ in the disc surface, more preferably, at most 5,000 nm$^2$, most preferably, at most 2,500 nm$^2$. This is also applicable to the crystal grain size in the disc surface. The average rough grain size of the front surface of the reflective layer has a value obtained by dividing a measured surface by the number of projections in fine recesses and projections in the area.

When the crystal grains are too fine, the thermal conductivity of the reflective layer may be reduced. Accordingly, it is preferable that the average rough grain size of the front surface is at least 500 nm$^2$.

The smoothness of the reflective layer has preferably an average surface roughness Ra of at most 4 nm, more preferably, at most 2 nm. The presence of the crystal grain size-controlling layer can expect to improve also the surface roughness of the reflective layer. However, the present invention aims at reducing the crystal grain size of the reflective layer facing the disc surface whereby the recesses and projections in the reflective layer do not substantially influence, and the value of the average rough grain size may not be improved. The crystal grain size of the reflective layer is influenced by the material of, the process for producing and the layer thickness of the crystal grain size-controlling layer. Accordingly, it is possible to select a suitable crystal grain size-controlling layer depending on conditions of use.

The electric resistivity of the reflective layer is correlated with the thermal conductivity. In order to obtain a sufficient heat radiation effect, the electric resistivity is preferably at most $2.0 \times 10^{-5}$ Ωcm, more preferably at most $1.0 \times 10^{-5}$ Ωcm. Although there is in particular no lower limit, the electric resistivity is actually $1.0 \times 10^{-7}$ Ωcm or more.

The most unique feature of the present invention is to improve the surface properties without reducing the thermal conductivity of the reflective layer by forming the crystal grain size-controlling layer between the reflective layer and the substrate.

Although there is no direct relation to the improvement of the surface roughness of the reflective layer of the present invention, there has been known a method of forming a seed layer between the substrate and a thin metallic layer in order to control the thickness of the thin metallic layer on the substrate to be uniform (JP-A-2000-21020). This method describes that a compound of $SiO_2$, $Al_2O_3$, TaO, $TiO_2$, CoO, $ZrO_2$, $Pb_2O_3$, AgO, ZnO, SnO, CaO, $V_2O_5$, CuO, $Cu_2O$, $Fe_2O_3$, SiON, SiAlON, $MgF_2$, $CaF_2$ or the like is used for the seed layer, whereby a two-dimensional growth of a thin translucent metallic layer of Au, Ag, Cu or another material is accelerated.

Although this document does not describe about the crystal grain size of the disc surface, the seed layer is to accelerate the two-dimensional growth of the crystal. Further, there is found a description "the migration in the surface becomes large to repeat the growth in a layer form" by which an effect to rather increase the crystal grain size in the plane may be given.

On the other hand, the function of the crystal grain size-controlling layer of the present invention is to make the crystal grain size of the metal constituting the reflective layer fine and uniform, and in this connection, the present invention is fundamentally different from the invention described in the above-mentioned document.

The reflective layer having a high thermal conductivity is in particular important for a rewritable phase-change optical disc wherein the cooling speed after the elevation of temperature due to irradiation of light to the medium influences largely the formation of recording marks. Here, description will be made as to the structure of the parts and other portions by exemplifying the rewritable phase-change optical disc. However, the present invention is also applicable to a magneto-optical disc, an optical disc exclusively used for retrieving, a write-once type optical disc having a dye recording layer or an inorganic recording layer or various types of disc having a reflective layer or a translucent reflective layer.

The rewritable type phase-change recording medium is in many cases has a reflective layer, a protective layer of a dielectric material, a recording layer, a protective layer of a dielectric material in this order on the substrate.

As the material for the substrate, a transparent resin such as polycarbonate, polyacrylate, polymethacrylate, polyolefin or the like or glass may be used for example, although there is in particular no limitation. The thickness of the substrate is generally from 0.1 mm to 10 mm.

In many cases, both surfaces of the recording layer are covered with protective layers. Each of the protective layers is formed in a thickness of from 10 nm to 500 nm. A material for the protective layer is determined in consideration of refractive index, thermal conductivity, chemical stability, mechanical strength, adhesion properties and so on. Generally, an oxide, a sulfide or a nitride of a metal or a semiconductor maternal having a high transparency and a high melting point, or a fluoride of Ca, Mg, Li or the like, may be used.

These oxide, sulfide, nitride and fluoride are not always necessary to have a stoichiometric composition. It is effective to control the composition to adjust the refractive index and so on, and to use a mixture of these materials. More specifically, a mixture of a heat resistant compound such as an oxide, a nitride or a carbide and ZnS or a sulfide of rare earth may be used. For example, a mixture of ZnS and $SiO_2$ is often used for a protective layer of a phase-change type optical disc. It is desirable that the layer density of such protective layer is 80% or more of a bulk state from the viewpoint of the mechanical strength.

The layer thickness of the protective layer is preferably 5 nm or more so that there is obtainable a sufficient anti-deformation effect to the recording layer and it functions as the protective layer. On the other hand, in order to reduce an inner stress of a dielectric material itself consisting the protective layer and to minimize the difference of elasticity of the layers in contact with this, and to prevent the occurrence of cracks, the layer thickness should be 500 nm or less.

Generally, a material constituting the protective layer has a low layer forming rate and a long layer forming time. In order to reduce the layer forming time to shorten a time for manufacturing and save the cost, it is preferable to control the layer thickness of the protective layer to be 200 nm or less. If the thickness of the protective layer is too large, the groove geometry in the substrate becomes different from the groove geometry in the recording layer. Namely, the groove depth in the surface of the substrate becomes shallower than that as intended, or the groove width in the surface becomes narrower than that as intended. From this, the thickness should be 200 nm or less, more preferably, 150 nm or less.

It is preferable that the layer thickness of the protective layer formed between the recording layer and the reflective layer is 5 nm or more in order to prevent the deformation of the recording layer. Generally, a microscopic plastic deformation is accumulated in the protective layer by repetitive overwriting, which causes scattering of light for retrieving to increase noises. In order to prevent this, it is preferable to form the protective layer in a thickness of 60 nm or less.

The layer thickness of the recording layer is preferably 5 nm or more in order to obtain a sufficient optical contrast; to increase a crystallization speed, and to achieve erasing of a recorded information in a shorter time. Further, the thickness is more preferably 10 nm or more for a purpose of increasing the reflectivity to be sufficiently high.

On the other hand, it is preferable that the layer thickness of the recording layer is 100 nm or less in order to prevent the occurrence of cracks and to obtain a sufficient optical contrast. More preferably, it should be 50 nm or less in order to reduce the thermal capacity and to increase the sensitivity of signals for recording. Further, the reduced thickness makes the volume change due to a phase change small, and makes the influence to a repetitive volume change by repetitive overwriting to the recording layer itself and the protective layers sandwiching the recording layer small. Further, it suppresses the accumulation of an irreversible microscopic deformation to thereby reduce noises and improves the durability to the repetitive overwriting.

In a medium for high density recording such as a rewritable DVD, the thickness of the recording layer is preferably 30 nm or less because requirements of reducing noises are more severe.

As the recording layer, a known phase-change type optical recording layer can be used. For example, a compound such as GeSbTe, InSbTe, AgSbTe or AgInSbTe is selected as a material capable of overwriting. A thin layer containing an alloy of $\{(Sb_2Te_3)_{1-x}(GeTe)_x\}_{1-y}Sb_y$ ($0.2<x<0.9$, $0 \leq y<0.1$) or an alloy of $(Sb_xTe_{1-x})_yM_{1-y}$ (where $0.6<x<0.9$, $0.7<y<1$, and M is at least one selected from the group consisting of Ge, Ag, In, Ga, Zn, Sn, Si, Cu, Au, Pd, Pt, Pb, Cr, Co, O, S, Se, V, Nb and Ta) as the main component, is stable in a crystal state or a non-crystal state, and permits a high phase transferring rate between the both states. Further, these compounds have such advantage that segregation seldom takes place in the repetitive overwriting, and are the most practical materials.

When the recording layer contains an alloy of $(Sb_xTe_{1-x})_yM_{1-y}$ (where $0.6<x<0.9$, $0.7<y<1$, and M is at least one selected from the group consisting of Ge, Ag, In, Ga, Zn, Sn, Si, Cu, Au, Pd, Pt, Pb, Cr, Co, O, S, Se, V, Nb and Ta) as the main component, it is essential to provide good cooling efficiency. In such case, it is particularly preferable to use Ag as the reflective layer.

In many cases, the recording layer is formed by sputtering an alloy target in inert gas, in particular, in an Ar gas. The thickness of each of the recording layer and the protective layer is selected so as to provide good laser light absorbing efficiency and to increase the amplitude of recording signals, i.e., the contrast between a recorded state and a non-recorded state in consideration of an interfering effect caused by a multilayer structure, in addition to restrictions from the mechanical strength and reliability.

The above-mentioned recording layer, protective layer, reflective layer and anti-diffusion layer are formed by sputtering. It is desirable that the layers are formed by placing each target for sputtering in an in-line device located in the same vacuum chamber because the oxidation and contamination by adjacent layers can be prevented. Further, such method is advantageous in producibility.

In a case of introducing light from a layer surface side but not a substrate side, it is necessary for the conventional phase-change type optical disc to form a reflective layer, a protective layer of a dielectric material, a recording layer and a protective layer of a dielectric material on the substrate in this order. In the application of the above-mentioned structure to the present invention, a crystal grain size-controlling layer is formed directly on the substrate, and then, the above-mentioned structure is formed on the layer. This structure is most preferable to perform the effect of the present invention. Of course, it is possible to form the crystal grain size-controlling layer via another layer without forming the crystal grain size-controlling layer in adjacent to the substrate.

Said another layer is made of a resin or a dielectric material. When a metal having a high thermal conductivity and a high reflectivity, which is analogous to the metal for the reflective layer, the surface roughness of the layer made of such metal becomes large. Accordingly, even if the crystal grain size-controlling layer is formed on this layer, the effect of improving the surface roughness of the reflective layer is lost. (It is no problem that the crystal grain size-controlling layer is formed under said another layer even in case that said another layer is made of a metal.)

Use of the layer made of a resin or a dielectric material eliminates such disadvantage. It is preferable that the substrate or said another layer in contact with the crystal grain size-controlling layer (an interlayer) has a surface roughness Ra of at most 1 nm.

As an example of the reflective layer of metal being a translucent reflective layer in the present invention, a phase-change type optical recording medium of so-called low-two-high type is mentioned. In this case, the reflectivity of the medium in a state that the phase-change type recording layer is amorphous is higher than the reflectivity of the medium in a state that it is crystal.

In this case, when light is introduced from a layer surface side, there is considered to use such structure that a crystal grain size-controlling layer, a reflective layer, a protective layer of a dielectric material, a recording layer, a protective layer of a dielectric material, a crystal grain size-controlling layer and a translucent reflective layer are formed on the substrate in this order.

In summarizing the above-mentioned, there are the following cases as the layer structure to which the crystal grain size-controlling layer of the present invention can be applied wherein light for recording or retrieving is incident from a layer surface side.

(1) Substrate, crystal grain size-controlling layer, reflective layer, protective layer of a dielectric material, recording layer and protective layer of a dielectric material.

(2) Substrate, crystal grain size-controlling layer, reflective layer, protective layer of a dielectric material, recording layer, protective layer of a dielectric material, crystal grain size-controlling layer and translucent reflective layer.

(3) Substrate, crystal grain size-controlling layer, reflective layer, protective layer of a dielectric material, recording layer, protective layer of a dielectric material, and translucent reflective layer.

Next, a process for producing the optical recording medium of the present invention will be described.

In the characteristic feature of the present invention, there is provided a process for producing an optical recording medium which comprises a substrate, and an interlayer, a reflective layer containing a metal as the main component and a recording layer, formed in this order on the substrate directly or via another layer made of a resin or a dielectric material, wherein as observed from a light-incoming direction, the reflective layer is located in front of the interlayer, and the interlayer contains the same metal as the metal constituting the main component of the reflective layer and also contains oxygen and/or nitrogen, said process comprising sputtering the metal onto the surface of said substrate or said another layer while introducing oxygen and/or nitrogen into the atmosphere, to form said interlayer, and then, sputtering the metal without introducing oxygen and/or nitrogen, to form said reflective layer. By this, it is possible to provide a process for producing the optical recording medium having excellent characteristics of disc signal with high producibility.

Namely, when the reflective layer is formed by sputtering, the interlayer (the crystal grain size-controlling layer) can easily be formed by introducing an oxygen gas or a nitrogen gas in a sputtering atmosphere for an initial predetermined time, and the reflective layer can continuously be formed by conducting the sputtering consequentially while the introduction is stopped. Thus, both the layers can be formed simply. Further, in the sputtering, a gradient of the content of oxygen or the content of nitrogen can be provided easily by changing an introduction rate of oxygen or nitrogen during the formation of the layer. Here, the introduction rate means the flow rate for introducing an oxygen gas or a nitrogen gas into the chamber for sputtering.

It is preferable that the integral power consumption by the sputtering to form the interlayer is from $1/100$ to $1/2$ of the integral power consumption by the sputtering to form the interlayer and the reflective layer. If it is too small, the layer thickness of the interlayer may become insufficient, and if it is too large, the layer thickness of the interlayer may be excessively large in comparison with the layer thickness of the reflective layer.

It is preferable that at the maximum introduction of oxygen and/or nitrogen, the amount of oxygen and/or nitrogen introduced, is from 1% to 300% of the inert gas introduced. Generally, inert gas such as an argon gas or a krypton gas is introduced in the sputtering. Namely, it is preferable that the amount of oxygen or nitrogen introduced is 1% to 300% with respect to the flow rate of the inert gas introduced into the chamber. If it is too small, the amount of oxygen or nitrogen taken into the interlayer may decrease, and if it is too large, the layer formation may not properly be performed.

Preferably, the amount of oxygen and/or nitrogen introduced, is gradually decreased, whereby a gradient of the content of oxygen or a gradient of the content of nitrogen in the interlayer can be provided.

According to the above-mentioned process for producing, an optical recording medium of the present invention, which comprises a substrate, and an interlayer, a reflective layer containing a metal as the main component and a recording layer, formed in this order on the substrate directly or via another layer made of a resin or a dielectric material, wherein as observed from a light-coming direction, the reflective layer is located in front of the interlayer, and the interlayer contains the same metal as the metal constituting the many component of the reflective layer and also contains oxygen and/or nitrogen, can be produced with good producibility.

The disclosure is based on Japanese Patent Application JP2000-234296 filed on Aug. 2, 2000, and the entire disclosure of the Japanese Patent Application is incorporated herein by reference in its entirety.

EXAMPLES

Now, the present invention will be described in detail with reference to Examples and Comparative Examples. However, it should be understood that the present invention is by no means restricted by such specific Examples.

The evaluation of physical properties in the following Examples and Comparative Examples is according to the measuring methods and the analytically measuring instruments described below unless indicated specifically. The surface roughness Ra of the substrates used in Examples and Comparative Examples was 0.49 nm.

1. Metal Content

An X-ray photo-electron spectroscopy (XPS method)

2. Average Rough Grain Size of the Surfaces

A method using an atomic force microscope (AFM) (NanoScope IIIa (tradename) manufactured by Digital Instrument Inc.) was used. Data of the number of points of 512×512 were taken in a surface area of 2.5 $\mu$m×2.5 $\mu$m to be measured, and the correction of gradient was conducted whereby an AFM picture image was obtained. Further, a differential picture image obtained by differentiation of the data was also outputted, and the number of projections in fine recesses and projections was counted from the differential picture image. The average rough grain size of the surface was indicated as a value obtained by dividing the measured surface by the number of projections.

3. Noise level

An optical disc device having a wavelength of 635 nm and a numerical aperture (NA) of objective lens of 0.6 was used. Laser light was introduced from a layer surface side via a glass substrate having a thickness of 0.6 mm. The linear velocity was 4 m/sec, the power for retrieving was 0.8 mW, the resolution band width was 30 kHz and the video band width was 100 Hz. The noise level was indicated by an average value of 4 times of measurement.

4. Carrier•noise Ratio (C/N ratio)

Signals of 4 m/sec, 0.94 MHz and a duty of 50% were recorded with a power for recording of 14 mW in a guide groove having a groove width of 0.35 $\mu$m and a groove pitch of 0.74 $\mu$m by a pulse train method.

5. Electric Resistivity

A resistance meter (Loresta MP MCP-T350 manufactured by Mitsubishi Chemical Corporation) was used.

Example 1

The sputtering of Ag was conducted on a polycarbonate substrate by a power of about 200 W and at an ultimate degree of vacuum of 2.0×10$^{-4}$ Pa or less at the time of initiating the sputtering while an Ar gas (in amount of 20 sccm) and an oxygen gas were introduced simultaneously, and then, the amount of oxygen introduced was gradually decreased from 50 sccm to 0 sccm during 50 sec while keeping a sputtering pressure of 0.28 Pa. Thus, an interlayer of Ag—O having a thickness of about 10 nm was formed on the polycarbonate substrate. After the interlayer has been formed, the sputtering of Ag was conducted for 638 sec continuously under the conditions of a power of 200 W and a sputtering pressure of 0.28 Pa without introducing the oxygen gas, whereby a reflective layer of Ag having a thickness of 120 nm was formed on the interlayer.

In the observation of a portion including the guide groove having a pitch of 0.74 $\mu$m of the reflective layer of Ag with a scanning type electron microscope (SEM), the grain size was small and uniform.

Figure 4A:
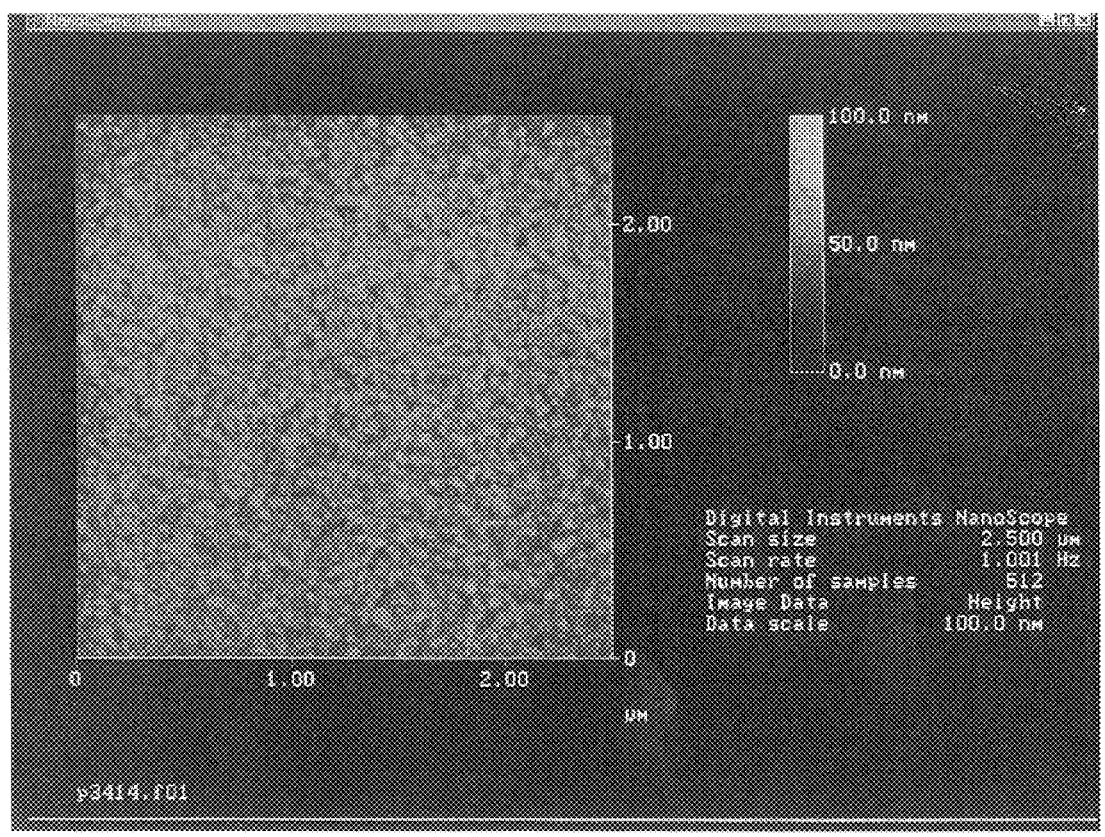
FIG. 4($a$) is an AFM picture image obtained by observing a reflective layer of Ag in Example 1 with AFM.
Figure 4B:
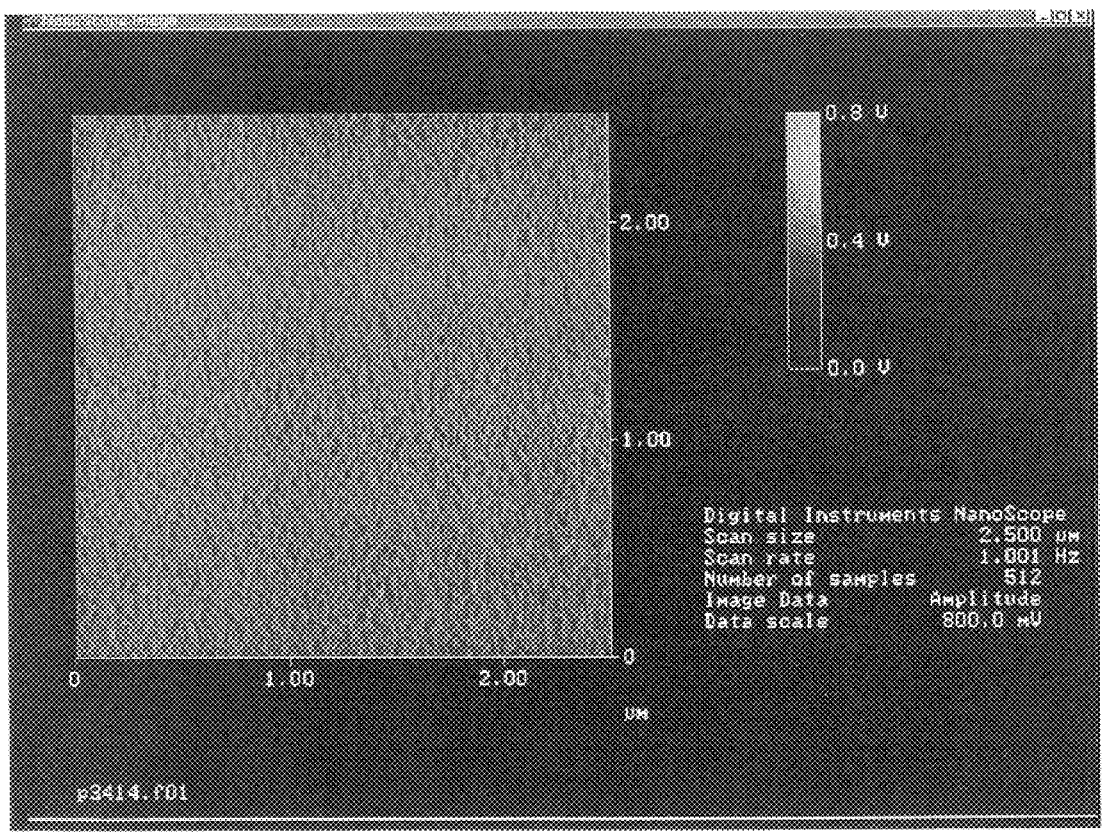

FIG. 4(a) shows an AFM picture image obtained by the observation of the reflective layer of Ag with AFM, and FIG. 4(b) shows a differential picture image thereof. The number of projections in fine recesses and projections was counted from the differential picture image, and the value obtained by dividing the measured surface by the number of projections (average rough grain size of the surface) was 2,288 nm$^2$.

Further, the electric resistivity of the reflective layer of Ag was 0.38×10$^{-5}$ $\Omega$cm.

Comparative Example 1

A reflective layer of Ag having a thickness of 120 nm was formed in the same manner as in Example 1 except that the reflective layer was formed directly on the polycarbonate substrate without forming the interlayer of Ag—O. In the observation of a portion including the guide groove having a pitch of 0.74 $\mu$m of the reflective layer of Ag with the scanning type microscope (SEM), the grain size was large and ununiform.

Figure 5A:
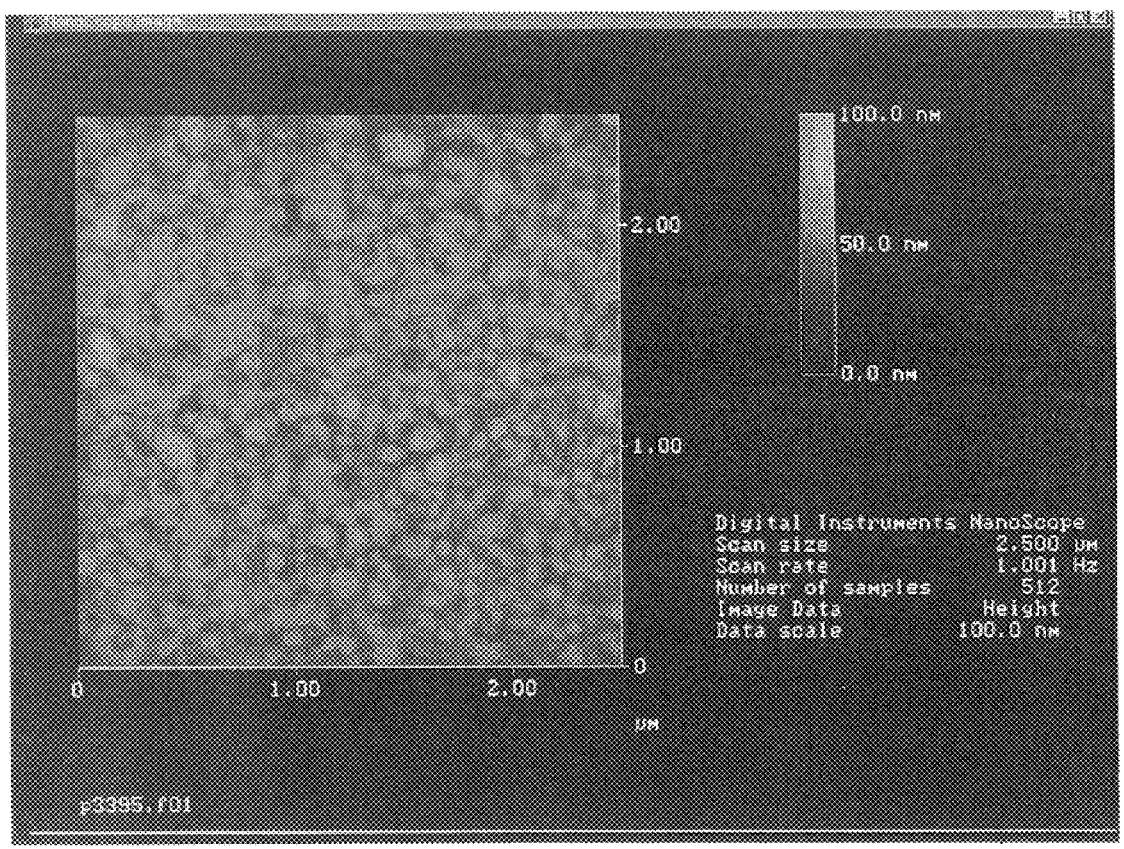
FIG. 5($a$) is an AFM picture image obtained by observing a reflective layer of Ag in Comparative Example 1 with AFM.
Figure 5B:
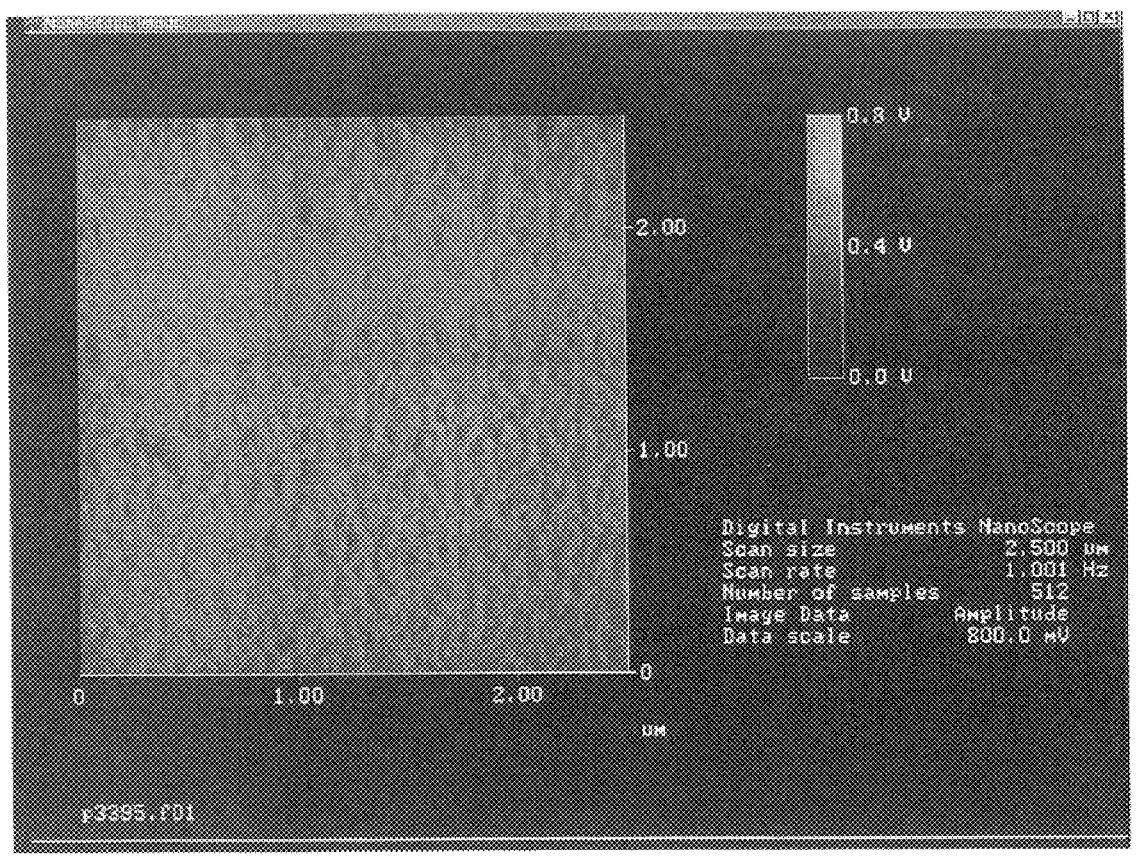

FIG. 5(a) shows an AFM picture image obtained by the observation of the reflective layer of Ag with AFM, and FIG. 5(b) is a differential picture image thereof. The average rough grain size of the surface with AFM was 9,174 nm$^2$.

Further, the electric resistivity of the reflective layer of Ag was 0.37×10$^{-5}$ $\Omega$cm, and there was substantially no difference from that in the Example 1. This fact indicates that the formation of the interlayer of Ag—O improves the surface properties of the disc without causing the deterioration of electrical and thermal characteristics of the reflective layer of Ag.

Comparative Example 2

A reflective layer of Ag having a thickness of 120 nm was formed in the same manner as in Example 1 except that the layer was formed directly on the polycarbonate substrate without forming the interlayer of Ag—O. In forming the reflective layer of Ag, however, oxygen was introduced in an amount of 50 sccm just before (about 4 sec.) the initiation of the sputtering, and the introduction of oxygen was stopped during the layer formation. In the observation of the reflective layer of Ag with SEM, it was found that the grain size was large and ununiform as in Comparative Example 1. This Comparative Example was conducted for verifying the influence of residual oxygen in the sputtering atmosphere. However, it was found that a desired reflective layer of Ag could not be prepared unless the interlayer of Ag—O was formed.

Comparative Example 3

In the process for forming the interlayer in Example 1, a SiO$_2$ layer having a thickness of 10 nm was formed on a polycarbonate substrate instead of the layer of Ag—O. The SiO$_2$ layer was formed by RF-sputtering of a SiO$_2$ target. On the SiO$_2$ layer, the reflective layer of Ag was formed in the same manner as in Example 1. In the observation of the reflective layer of Ag with the scanning type electron microscope (SEM), it was found that the grain size was large and ununiform. This Comparative Example indicates that a desired effect can not be provided unless a metallic species contained as the main component in the interlayer is the same as a metallic species contained as the main component in the reflective layer.

Example 2

An interlayer of Ag—O (about 10 nm) and a reflective layer of Ag (120 nm) were formed on a polycarbonate substrate in the same manner as in Example 1. On these, a SiO$_2$ layer (5 nm), a dielectric layer of ZnS—SiO$_2$ (20 nm), a recording layer of Ge$_5$Sb$_{71}$Te$_{24}$ (15 nm) and a dielectric layer of ZnS—SiO$_2$ (140 nm) were successively formed by sputtering. The provision of the SiO$_2$ layer between the reflective layer of Ag and the ZnS—SiO$_2$ layer is to prevent the occurrence of problems such as the diffusion of S and so on into the reflective layer of Ag to decrease the thermal conductivity and so on.

In the measurement of the noise level at 0.94 MHz on a mirror surface portion of the obtained disc, which was not yet initialized, about −69 dBm was detected. The reflectivity of the disc was 20%. Further, the C/N ratio of the disc, which was subjected to initial crystallization, was measured to find 54.9 dB.

Comparative Example 4

A reflective layer of Ag (120 nm) were formed directly on a polycarbonate substrate without forming the interlayer according to Comparative Example 1. On this, a $SiO_2$ layer (5 nm), a dielectric layer of ZnS—$SiO_2$ (20 nm), a recording layer of $Ge_5Sb_{71}Te_{24}$ (15 nm) and a dielectric layer of ZnS—$SiO_2$ (140 nm) were successively formed by sputtering in the same manner as Example 1.

In the measurement of the noise level at 0.94 MHz on a mirror surface portion of the obtained disc, which was not yet initialized, about −66 dBm was detected, which was 3 dBm lower than Example 2. The reflectivity of the disc was 20%. Further, the C/N ratio of the disc, which was subjected to initial crystallization, was measured to find 52.1 dB, which was 3 dB lower than Example 2.

Example 3

A sample that an AgO layer having a thickness of about 200 nm was formed on a glass substrate, was prepared by sputtering an Ag target while an Ar gas in 20 sccm and an oxygen gas in 50 sccm were introduced simultaneously. The other conditions for sputtering were the same as the conditions for forming the interlayer in Example 1. As a result of analyzing the AgO layer by an X-ray diffraction method, a weak peak capable of identifying $Ag_2O$ and AgO was observed although the crystallizability was poor and an amorphous-like structure was found.

Example 4 and Comparative Example 5

On a polycarbonate substrate with a guide groove having a groove depth of 43 nm, a groove width of 0.3 $\mu$m and a groove pitch of 0.6 $\mu$m, an interlayer of Ag—O (10 nm), a reflective layer of Ag (100 nm), a $SiO_2$ layer (5 nm), a $(ZnS)_{80}(SiO_2)_{20}$ layer (15 nm), a recording layer of $Ge_5In_3Sb_{68}Te_{24}$ (14 nm) and a $(ZnS)_{80}(SiO_2)_{20}$ layer (45 nm) were formed by sputtering. On these layers, further, a polycarbonate sheet of 100 $\mu$m was bonded by using an acrylic type UV curing resin to thereby prepare a disc (Example 4).

The reason why the $SiO_2$ layer is provided between the reflective layer of Ag and the ZnS—$SiO_2$ layer is to prevent the occurrence of problems such as the diffusion of S and so on into Ag to reduce the thermal conductivity and so on. The interlayer was formed by sputtering Ag by a power of 500 W while introducing an Ar gas in 30 sccm and an oxygen gas in 40 sccm simultaneously.

Further, a disc was prepared in the same manner as above except that the interlayer was not formed (Comparative Example 5).

After the initial crystallization of these discs, RLL (1,7) modulation signals were recorded in a groove portion as observed from a laser-incoming direction, and evaluation of the characteristics of these discs was carried out by using an optical disc evaluation equipment with an optical system having a wavelength of 404 nm and NA of 0.85. Laser light was introduced from the direction opposite to the substrate with respect to the recording layer.

The pulse for recording was determined as follows. In forming marks (an amorphous phase) having a length nT (T represents a reference clock period, and n represents a natural number), a time period nT is divided as in the below-mentioned formula (1).

$\alpha_1 T, \beta_1 T, \alpha_2 T, \beta_2 T, \ldots, \alpha_{m-1}T, \beta_{m-1}T, \alpha_m T, \beta_m T,$ (where $\alpha_1+\beta_1+\alpha_2+\beta_2+ \ldots, \alpha_{m-1}+\beta_m+\alpha_m+\beta_m=n-j$, j=0.9 and m=n−1)

In formula (1), laser light of a recording power Pw was irradiated in a time of $\alpha_i T (1 \leq i \leq m)$, and laser light of a bias power of Pb was irradiated for recording in a time of $\beta_i T (1 \leq i \leq m)$. Light having an erasing power Pe was irradiated in a region between marks. In this case $\alpha_1=0.4$, $\alpha_i=0.35 (2 \leq i \leq m)$ and $\beta_i=0.65 (1 \leq i \leq m-1)$, $\beta_m=0.7$.

In linear velocity for recording =5.7 m/s, reference clock period T=15.15 ns, bias power Tb=0.1 mW and erasing power Pe=1.5 mW, recording was conducted by changing the recording power Pw, and data to clock jitters of the recorded signals were measured. The values of the jitters were standardized by the reference clock period. The recording power having the smallest value of jitter was around 3.6 mW, and the jitters at a recording power of 3.6 mW were 9.1% in Example and 10.1% in Comparative Example.

An Ag—O layer formed by the same condition as for the interlayer in Example 4 was formed on a glass substrate in a thickness of about 200 nm to prepare a sample, and the sample was analyzed by the X-ray diffraction method. As a result, a weak peak capable of identifying $Ag_2O$ and Ago was found although this layer was poor in crystallizability and have an amorphous-like structure. Further, in measuring the content of oxygen by the XPS method, the content of oxygen was about 10 atomic %. The content of oxygen in the layer formed as well (the layer formed by the same conditions as for the reflective layer) provided that the amount of oxygen introduced in forming the layer, was about 0 atomic %.

From the observation of the transparency of the layer and a result of X-ray analysis, the composition of the interlayer on the substrate side in Example 1 can be considered to be the same as that of the interlayer in Example 4.

Figure 6A:
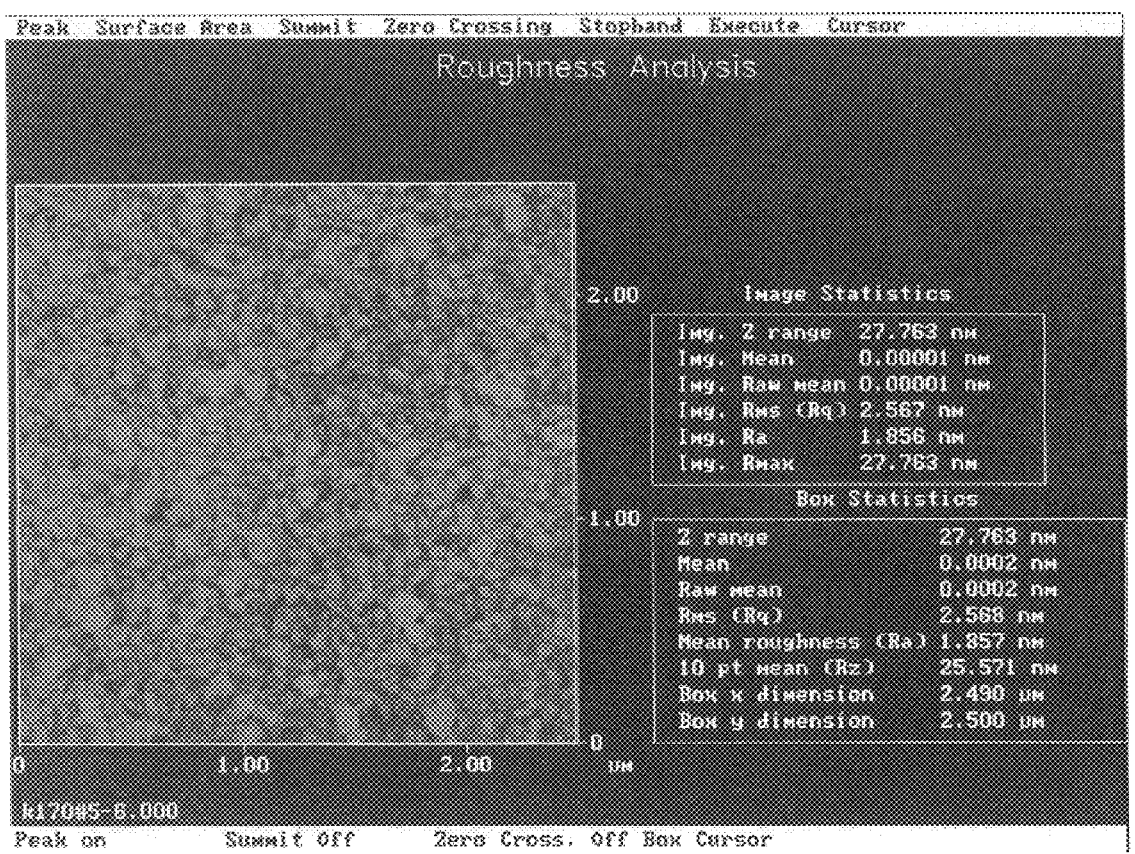
FIG. 6($a$) is an AFM picture image obtained by observing a reflective layer of Ag in Example 4 with AFM.
Figure 6B:
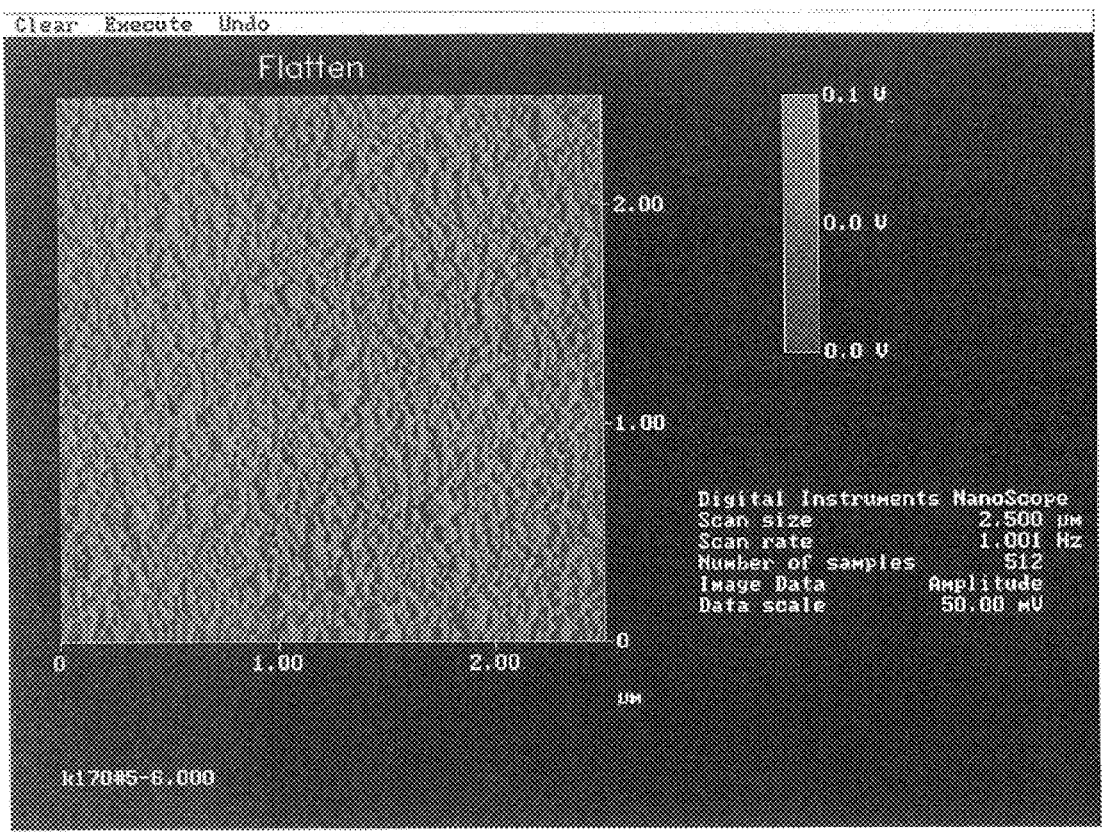

An interlayer of Ag—O and a reflective layer of Ag were prepared on a polycarbonate substrate by sputtering under the same conditions as Example 4. In the observation of the reflective layer of Ag with the scanning type electron microscope (SEM), it was found that the grain size was small and relatively uniform. FIG. 6(a) shows an AFM picture image obtained by observing the reflective layer of Ag with AFM, and FIG. 6(b) shows a differential picture image thereof. The average rough grain size of the surface was 4,292 $nm^2$. Further, the electric resistivity of the reflective layer of Ag was $0.28 \times 10^{-5}$ $\Omega$cm.

Figure 7A:
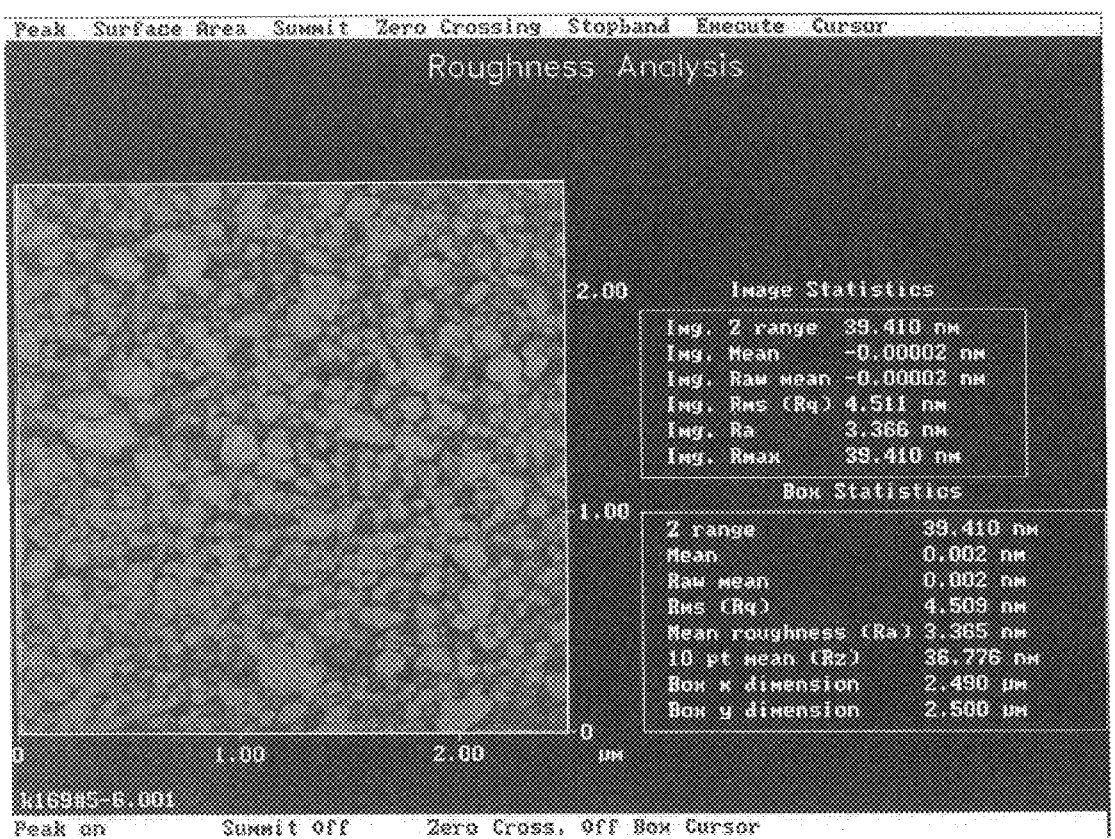
FIG. 7($a$) is an AFM picture image obtained by observing a reflective layer of Ag in Comparative Example 5 with AFM.
Figure 7B:
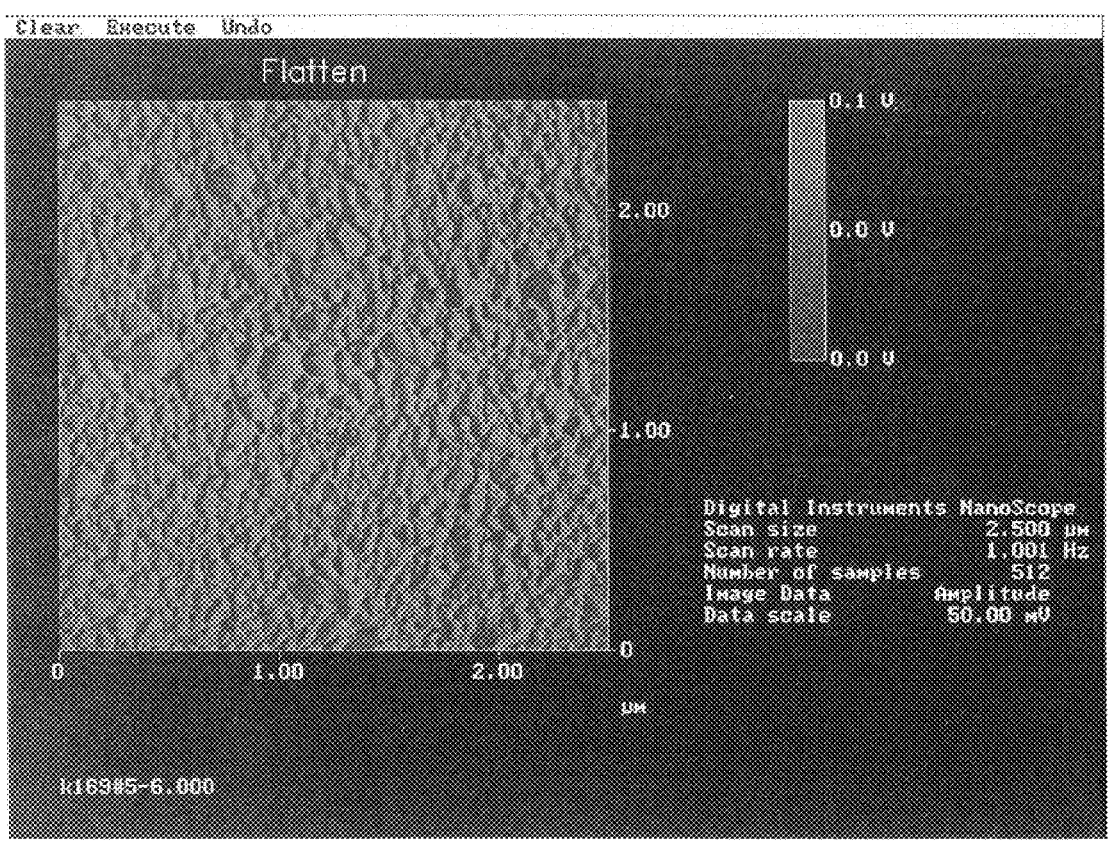

In the next, a reflective layer of Ag was formed on a polycarbonate substrate by sputtering under the same conditions as Comparative Example 5. In the observation of the reflective layer of Ag with the scanning type electron microscope (SEM), it was found that the grain size was large and ununiform. FIG. 7(a) shows an AFM picture image obtained by observing the reflective layer of Ag with AFM, and FIG. 7(b) shows a differential picture image thereof. The average rough grain size of the surface was 7,692 $nm^2$.

Example 5 and Comparative Example 6

On a polycarbonate substrate, an Ag—N layer (about 10 nm), a reflective layer of Ag (120 nm), a $SiO_2$ layer (5 nm), a ZnS—SiO$_2$ layer (20 nm), a recording layer of Ge$_5$Sb$_{71}$Te$_{24}$ (15 nm), and a dielectric layer of ZnS—SiO$_2$ (140 nm) were formed by sputtering (Example 5). The reason why the SiO$_2$ layer was formed between the reflective layer of Ag and the ZnS—SiO$_2$ layer is to prevent the occurrence of problems of diffusing S and so on into the layers containing Ag to reduce the thermal conductivity.

The Ag—N layer was formed by sputtering Ag by a power of about 200 W while introducing an Ar gas in 20 sccm and a nitrogen gas simultaneously, and the introduction rate of the nitrogen gas was decreased gradually from 50 sccm to 0 sccm in 50 sec during which the sputtering pressure was maintained to 0.28 Pa. Subsequent to the formation of the Ag—N layer, the reflective layer of Ag was formed under conditions of a power of 200 W and a sputtering pressure of 0.28 Pa. The time for forming the reflective layer of Ag was 638 sec.

On a polycarbonate substrate, similarly, a reflective layer of Ag (120 nm), a SiO$_2$ layer (5 nm), a ZnS—SiO$_2$ layer (20 nm), a recording layer of Ge$_5$Sb$_{71}$Te$_{24}$ (15 nm) and a dielectric layer of ZnS—SiO$_2$ (140 nm) were formed by sputtering (Comparative Example 6).

A mirror surface portion of each of these discs, which was not initialized, was retrieved with an optical disc evaluation equipment with an optical system having a wavelength of 635 nm and NA of 0.6 to measure the noise level. Laser light was introduced from a layer surface side through a glass substrate having a thickness of 0.6 mm. In linear velocity=4 m/s, retrieving power=0.8 mW, resolution band width=30 kHz and video band width=100 Hz, 4 number of times of averaging were conducted. In the measurement of the noise level at 0.94 MHz, the noise level was −69.1 dBm in Example 5 and −68.9 dBm in Comparative Example 6. The reflectivity of either disc had the same value.

Example 6 and Comparative Example 7

A disc was prepared in the same manner as Example 5 except that on a polycarbonate substrate, an Al—Ta—N layer (about 10 nm) and an Al$_{99.5}$Ta$_{0.5}$ layer (100 nm) were formed by sputtering (Example 6).

The Al—Ta—N layer was formed by sputtering an Al$_{99.5}$Ta$_{0.5}$ target by a power of 500 W while introducing an Ar gas in 45 sccm and a nitrogen gas simultaneously, and the introduction rate of the nitrogen gas was decreased gradually from 80 sccm to 0 sccm in 40 sec.

Similarly, an Al$_{99.5}$Ta$_{0.5}$ layer (100 nm) was formed on a polycarbonate substrate by sputtering (Comparative Example 7).

A mirror surface portion of each of the discs was retrieved with an optical disc evaluation equipment with an optical system having a wavelength of 635 nm and NA of 0.6 to measure the noise level. Laser light was introduced from a layer surface side through a glass substrate having a thickness of 0.6 mm. In linear velocity=4 m/s, retrieving power= 0.8 mW, resolution band width=30 kHz and video band width=100 Hz, 4 number of times of averaging were conducted. In the measurement of the noise level at 0.94 MHz, the noise level was −71.3 dBm (an inner circumferential portion) and −72.4 dBm (an outer circumferential portion) of the disc of Example 6, and −71.3 dBm (an inner circumferential portion) and −71.6 dBm (an outer circumferential portion) of the disc of Comparative Example 7. The reflectivity of either disc had the same value.

According to the optical recording medium and the process for producing the same of the present invention, the grain size of the metal forming a reflective layer can be made fine and uniform, and the surface properties can be improved without changing the thermal conductivity and the reflectivity, and without reducing producibility. Accordingly, the optical recording medium having excellent characteristics of signals for recording/retrieving discs can be obtained.

What is claimed is:

1. An optical recording medium for recording and/or retrieving information by irradiation of light, which comprises a substrate, and an interlayer, a reflective layer containing a metal as the main component and a recording layer, formed in this order on the substrate directly or via another layer made of a resin or a dielectric material, wherein as observed from a light-incoming direction, the reflective layer is located in front of the interlayer, the interlayer contains the same metal as the metal constituting the main component of the reflective layer and also contains oxygen and/or nitrogen, and the interlayer has a content of the metal smaller than the reflective layer.

2. The optical recording medium according to claim 1, wherein the interlayer has an amorphous structure or a crystal structure which is different from the crystal structure of the reflective layer.

3. The optical recording medium according to claim 1, wherein the metal is capable of forming a compound with oxygen and/or nitrogen.

4. The optical recording medium according to claim 3, wherein the interlayer contains a compound of the metal with oxygen and/or nitrogen.

5. The optical recording medium according to claim 1, wherein the interlayer contains oxygen.

6. The optical recording medium according to claim 1, wherein the interlayer contains the metal as the main component.

7. The optical recording medium according to claim 1, wherein the content of the metal in the interlayer increases from the substrate side towards the reflective layer side.

8. The optical recording medium according to claim 1, wherein the metal is Ag.

9. The optical recording medium according to claim 1, wherein the substrate or another layer in contact with the interlayer has a surface roughness Ra of at most 1 nm.

10. The optical recording medium according to claim 1, wherein the surface of the reflective layer on the side opposite to the substrate side has an average rough grain size of at most 6,000 nm$^2$.

11. The optical recording medium according to claim 10, wherein the surface of the reflective layer on the side opposite to the substrate side has an average rough grain size of at most 5,000 nm$^2$.

12. The optical recording medium according to claim 1, wherein the reflective layer has an electrical resistivity of at most $2.0 \times 10^{-5}$ Ωcm.

13. The optical recording medium according to claim 1, wherein the recording layer is a phase-change type recording layer.

14. An optical recording medium for recording and/or retrieving information by irradiation of light, which comprises a substrate, and a crystal grain size-controlling layer, a reflective layer containing a metal as the main component and a recording layer, formed in this order on the substrate directly or via another layer made of a resin or a dielectric material, wherein as observed from a light-incoming direction, the reflective layer is located in front of the crystal grain size-controlling layer, and the crystal grain size-controlling layer has a function to make the crystal grain size of the metal forming the reflective layer fine and uniform.

15. The optical recording medium according to claim 14, wherein the surface of the reflective layer on the side opposite to the substrate side has an average rough grain size of at most 6,000 nm$^2$.

16. The optical recording medium according to claim 15, wherein the surface of the reflective layer on the side opposite to the substrate side has an average rough grain size of at most 5,000 nm$^2$.

17. A process for producing an optical recording medium for recording and/or retrieving information by irradiation of light, which comprises a substrate, and an interlayer, a reflective layer containing a metal as the main component and a recording layer, formed in this order on the substrate directly or via another layer made of a resin or a dielectric material, wherein as observed from a light-incoming direction, the reflective layer is located in front of the interlayer, and the interlayer contains the same metal as the metal constituting the main component of the reflective layer and also contains oxygen and/or nitrogen, said process comprising sputtering the metal onto the surface of said substrate or said another layer while introducing oxygen and/or nitrogen into the atmosphere, to form said interlayer, and then, sputtering the metal without introducing oxygen and/or nitrogen, to form said reflective layer.

18. The process for producing an optical recording medium according to claim 17, wherein the integral power consumption by the sputtering to form said interlayer is from $\frac{1}{10}$ to $\frac{1}{2}$ of the integral power consumption by the sputtering to form said interlayer and said reflective layer.

19. The process for producing an optical recording medium according to claim 17, wherein at the maximum introduction of oxygen and/or nitrogen, the amount of oxygen and/or nitrogen introduced, is from 1 to 300% of the amount of inert gas introduced.

20. The process for producing an optical recording medium according to claim 17, wherein the amount of oxygen and/or nitrogen introduced, is gradually decreased.

* * * * *